United States Patent
Fodor et al.

(10) Patent No.: US 10,880,936 B2
(45) Date of Patent: Dec. 29, 2020

(54) CLUSTER HEAD SELECTION IN A COMMUNICATIONS NETWORK

(71) Applicant: Telefonaktiebolaget LM Ericsson (publ), Stockholm (SE)

(72) Inventors: Gabor Fodor, Hässelby (SE); Bengt Lindoff, Bjärred (SE); Qianxi Lu, Beijing (CN); Qingyu Miao, Beijing (CN); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/541,328

(22) Filed: Aug. 15, 2019

(65) Prior Publication Data

US 2019/0373655 A1    Dec. 5, 2019

Related U.S. Application Data

(63) Continuation of application No. 14/898,163, filed as application No. PCT/CN2013/078040 on Jun. 26, 2013, now Pat. No. 10,390,378.

(51) Int. Cl.
*H04W 76/14* (2018.01)
*H04W 84/20* (2009.01)
(Continued)

(52) U.S. Cl.
CPC ............ *H04W 76/14* (2018.02); *H04L 45/46* (2013.01); *H04W 16/28* (2013.01); *H04W 40/32* (2013.01); *H04W 56/001* (2013.01); *H04W 68/005* (2013.01); *H04W 72/06* (2013.01); *H04W 72/082* (2013.01); *H04W 84/20* (2013.01)

(58) Field of Classification Search
CPC ... H04W 76/023; H04W 16/28; H04W 40/32; H04W 56/001; H04W 68/005; H04W 72/06; H04W 72/082; H04W 84/20; H04L 45/46
See application file for complete search history.

(56) References Cited

U.S. PATENT DOCUMENTS

| 7,120,456 B1 | 10/2006 | Elliot et al. |
| 2002/0169846 A1 | 11/2002 | Chen et al. |
| | (Continued) | |

FOREIGN PATENT DOCUMENTS

| CN | 101188444 A | 5/2008 |
| CN | 102970722 A | 3/2013 |
| | (Continued) | |

OTHER PUBLICATIONS

Kulkarni, A. et al., "Engineering Self-Critical Behavior in Mobile Adhoc Networks," MILCOM 2006: Washington, D.C., Oct. 23, 2006, pp. 1-7, Piscataway, NJ, XP031331738.

*Primary Examiner* — Jae Y Lee
(74) *Attorney, Agent, or Firm* — Coats & Bennett, PLLC

(57) ABSTRACT

There is provided cluster head selection in a communications network. A respective beacon signal is by a wireless device received from each one of at least one further wireless device. Each beacon signal comprises a cluster head capability metric. Each of the received cluster head capability metrics is compared to at least one qualifying criterion. One of the at least one further wireless devices is selected as the cluster head of the wireless device based on the comparison.

11 Claims, 3 Drawing Sheets

(51) Int. Cl.
  *H04L 12/715* (2013.01)
  *H04W 40/32* (2009.01)
  *H04W 16/28* (2009.01)
  *H04W 56/00* (2009.01)
  *H04W 68/00* (2009.01)
  *H04W 72/06* (2009.01)
  *H04W 72/08* (2009.01)

(56) References Cited

U.S. PATENT DOCUMENTS

| | | |
|---|---|---|
| 2007/0019569 A1 | 1/2007 | Park et al. |
| 2007/0299950 A1 | 12/2007 | Kulkarni |
| 2010/0046363 A1 | 2/2010 | Shenoy et al. |
| 2011/0235561 A1* | 9/2011 | Liu .................. H04L 41/30 370/311 |
| 2011/0268006 A1 | 11/2011 | Koskela et al. |
| 2014/0099958 A1* | 4/2014 | Wilhelmsson .... H04W 36/0009 455/437 |
| 2015/0173011 A1* | 6/2015 | Das ................ H04W 24/02 370/328 |
| 2015/0282232 A1 | 10/2015 | Yamazaki |

FOREIGN PATENT DOCUMENTS

| | | |
|---|---|---|
| CN | 103052130 A | 4/2013 |
| EP | 1978689 A1 | 10/2008 |
| WO | 02087172 A1 | 10/2002 |
| WO | 2009018212 A1 | 2/2009 |

* cited by examiner

CLUSTER HEAD SELECTION IN A COMMUNICATIONS NETWORK

RELATED APPLICATIONS

This application is a continuation of prior application Ser. No. 14/898,163, filed 14 Dec. 2015, which was the National Stage of International Application PCT/CN2013/078040 filed 26 Jun. 2013, the entire disclosure of each being hereby incorporated by reference herein.

TECHNICAL FIELD

Embodiments presented herein relate to communications network, and particularly to a method, a wireless device and a computer program for cluster head selection in a communications network.

BACKGROUND

In mobile communication networks, there is always a challenge to obtain good performance and capacity for a given communications protocol, its parameters and the physical environment in which the mobile communication network is deployed.

In national security and public safety (NSPS) scenarios, there is a need to allow devices (such as cellular user equipments, UE) to communicate directly with one another when they are under cellular network coverage. In 3GPP LTE networks (NW), this is made possible by so called "Device to Device communication (D2D), also known as Proximity Services (ProSe)" technology that allows a cellular base station (BS or eNB) to set up a direct D2D link between two UEs and allocate resources for that link.

In NSPS situations, however, the cellular network, including the eNB can get damaged or become partially or completely dysfunctional due to a disaster or emergency situation. In such situations, UEs should still be able to communicate as long as they are in the coverage area of each other or can reach each other via several D2D hops. In other words, it may be desirable that UEs can engage in local communication even when the cellular network services are in parts or completely unavailable. On the other hand, it may also be desirable that UEs get access to whatever services that are intact and still available in an NSPS situation.

Device discovery is a well known and widely used component of many existing wireless technologies, including ad hoc and cellular networks. Examples include Bluetooth, several variants of the IEEE 802.11 standards suite such as WiFi Direct, and Flashlinq. One mechanism used by these standards is to use specially designed beacon signals that devices broadcast so that nearby devices can detect the proximity of such beacon broadcasting devices. In addition to device detection, beacon signals also allow nearby devices to detect the identity and some characteristics of the broadcasting device. Receiving devices can also use the beacon signal to estimate the channel and/or path loss to the beacon broadcasting device.

Recently, device-to-device communications as an underlay to cellular networks have been proposed as a means to take advantage of the proximity of communicating devices and at the same time to allow devices to operate in a controlled interference environment. Various device discovery mechanisms applicable for devices in cellular spectrum have also been proposed. These mechanisms make use of various forms of network assistance, such as obtaining synchronization, allocating or scheduling peer discovery resources (PDR) or tuning other parameters of the discovery process and the contents of the beacon signals.

One mechanism that addresses D2D communication both within complete network coverage and within partial network coverage, as well as outside network coverage is based on clustering, where some of the devices (UEs) act as a Cluster Head (CH) and other devices act as Slaves to the CH. In general terms, a CH node can be compared to a small range base station that,—in the absence of a cellular eNB— provides (a subset of and) similar functionality as an eNB. For example, a CH node can provide synchronization and radio resource management within its cluster and also act as a central node to create a tree topology for communication with the cluster. In addition, the CH can also provide a relaying functionality towards other clusters or towards a cellular eNB.

While clustering and cluster head based integrated ad hoc and cellular communications can meet the basic requirement on managing direct D2D communications even in the absence of the cellular NW, one technical aspect is the selection of the cluster head nodes.

One typical way to establish cluster head selection is that a given device self-nominates as cluster head and then announces itself as the cluster head. This self-nomination is based on randomness or using some other criteria. Since several devices within the proximity of each other may self-nominate as cluster heads, a mutual negotiation is typically necessary in order for one of them to remain as the single cluster head.

According to EP1978689 there is disclosed a method for cluster head selection in an ad-hoc network. According to EP1978689 a token is created by each node in a given selection process. The tokens are circulated between the nodes in the ad-hoc network. When a node receives a token it compares it to a token stored in the node. The stored token represents the best token received by the node so far. If the received token is better than the stored token it replaces the stored token in the memory of the node and the received token is also forwarded to another node in the ad-hoc network. However, if the received token is not better than the stored token it is ignored. Eventually the best token will be recorded in all the nodes and the node associated with the best token becomes cluster head.

However, there is still a need for an improved cluster head selection in a communications network.

SUMMARY

An object of embodiments herein is to provide improved cluster head selection in a communications network.

The inventors of the enclosed embodiments have realized that one issue for a cluster based communications network is how to select which devices that should act as cluster heads. Specifically when multiple devices enter the proximity of each other, how they organize themselves into one or several clusters, and how one or several cluster head(s) are selected. The inventors of the enclosed embodiments have further realized that it may be beneficial to ensure that the different devices have a common understanding of which devices act as cluster heads and which devices are cluster members belonging to the same cluster. As herein defined, the "common understanding" among devices is generally referred to as the integrity of the cluster and the roles of the devices in the cluster. The inventors of the enclosed embodiments have further realized that one issue with existing mechanisms for clustering in communications network, as exemplified by EP1978689, is that mutual negotiation would be necessary, which is typically complex and convergence may be difficult to achieve. Moreover, existing solutions do not disclose how connections between clusters are created—i.e. clusters would typically be isolated. Existing solutions do not disclose how to utilize partially damaged or dysfunctional network nodes, such as cellular base stations, in the cluster formation process. An object of embodiments herein is therefore to provide a cluster head selection whereby partially dysfunctional network nodes and UEs can form clusters. For example, if a cellular base station can no longer provide access to core network services but can still provide synchronization signals, then UEs should be able to take advantage of such synchronization signals even when not accessing core network services.

A particular object is therefore to provide improved cluster head selection in a communications network without being dependent on mutual negotiation.

According to a first aspect there is presented a method for cluster head selection in a communications network. The method is performed by a wireless device. The method comprises receiving a respective beacon signal from each one of at least one further wireless device, each beacon signal comprising a cluster head capability metric. The method comprises comparing each of the received cluster head capability metrics to at least one qualifying criterion. The method comprises selecting one of the at least one further wireless devices as the cluster head of the wireless device based on the comparison.

Advantageously, since each device, based on a few rules, performs a local selection of which peer device that shall act as its cluster head the selection criterion is simple to implement and the quality and uniformity of independent implementations can therefore be assured.

Advantageously, since also a cluster head may in a similar manner select a peer device as its own cluster head, interconnected clusters are automatically created, which prevents isolated clusters/devices.

According to a second aspect there is presented a wireless device for cluster head selection in a communications network. The wireless device comprises a receiver. The receiver is arranged to receive a respective beacon signal from each one of at least one further wireless device, each beacon signal comprising a cluster head capability metric. The wireless device comprises a processing unit. The processing unit is arranged to compare each of the received cluster head capability metrics to at least one qualifying criterion. The processing unit is arranged to select one of the at least one further wireless devices as the cluster head of the wireless device based on the comparison.

According to a third aspect there is presented a computer program for cluster head selection in a communications network, the computer program comprising computer program code which, when run on a wireless device, causes the wireless device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
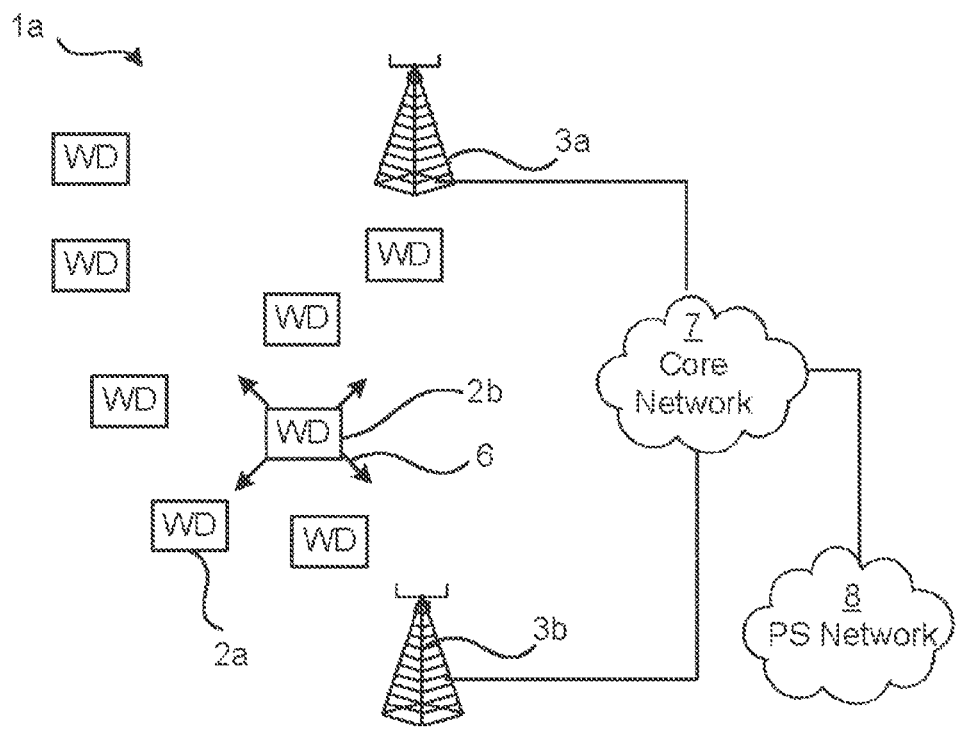
FIG. 1 is a schematic diagram illustrating a communications network according to embodiments.

FIG. 1 shows a schematic overview of an exemplifying wireless communication system 1a. The wireless communication system 1a comprises network nodes 3a, 3b providing network coverage over cells (not shown). Each cell is served by at least one of the network nodes 3a, 3b. A wireless device (WD) 2a, 2b, positioned in a particular cell is thus provided network service by the network node 3a, 3b serving that particular cell. Further, the network nodes 3a, 3b are arranged to communicate with other network nodes 3a, 3b via communications links. The network nodes 3a, 3b are also operatively connected to a core network 7. The core network 7 may provide services and data to the WD 2a, 2b operatively connected to at least one of the network nodes 3a, 3b from an external packet switched (PS) data network 8. As the skilled person understands, the wireless communications system 1a may comprise a plurality of network nodes 3a, 3b and a plurality of WDs 2a, 2b operatively connected to at least one of the plurality of network nodes 3a, 3b. The communications system 1a may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, etc., as long as the principles described hereinafter are applicable.

One situation that could arise is that one or more of the WDs are outside the coverage area of the network nodes 3a, 3b, or that there is a failure of a network node 3a, 3b, or that the maximum cell load limit of a network node 3a, 3b is reached. In order for a WD not able to establish a direct communications link to a network node 3a, 3b to access services and data of the PS network 8, or for a WD to engage in local communications with UEs that are in its proximity (for this or any other purpose), clustering mechanisms may be deployed in the communications network 1a. By means of the clustering mechanisms an ad hoc network may thus be formed. Such mixed cellular and ad hoc networks provide a natural solution to providing communication services with partial infrastructure coverage or even in geographical areas without any cellular network coverage due to lack of infrastructure or due to natural disaster, public safety or failure situations.

The embodiments disclosed herein relate to cluster head selection in a communications network 1a. In order to obtain cluster head selection in the communications network 1a there is provided a wireless device 2a, 2b, a method performed by the wireless device 2a, 2b, a computer program comprising code, for example in the form of a computer program product, that when run on the wireless device 2a, 2b causes the wireless device 2a, 2b to perform the method.

Figure 2A:
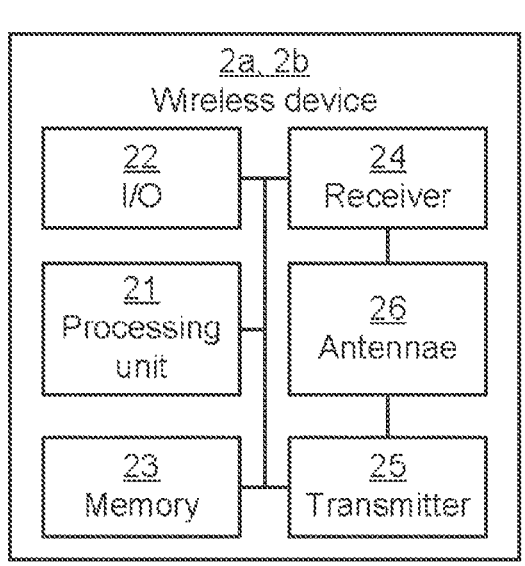
FIGS. 2a and 2b are schematic diagrams showing functional modules of a wireless device according to embodiments.

FIG. 2a schematically illustrates, in terms of a number of functional modules, the components of a wireless device 2a, 2b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 30 (as in FIG. 3), e.g. in the form of a memory 23. Thus the processing unit 21 is thereby arranged to execute methods as herein disclosed. The memory 23 may also comprise persistent storage, which, for example, can be any single one or combination of magnetic memory, optical memory, solid state memory or even remotely mounted memory. The wireless device 2a, 2b may further comprise an input/output (I/O) interface 22 for receiving and providing information to a user interface. The wireless device 2a, 2b also comprises one or more transmitters 25 and receivers 24, comprising analogue and digital components and a suitable number of antennae 26 for radio communication with a network node 3 and/or with another wireless device 2a, 2b. The processing unit 21 controls the general operation of the wireless device 2a, 2b, e.g. by sending control signals to the transmitter 25 and/or receiver 24 and receiving reports from the transmitter 25 and/or receiver 24 of its operation. Other components, as well as the related functionality, of the wireless device 2a, 2b are omitted in order not to obscure the concepts presented herein.

Figure 2B:
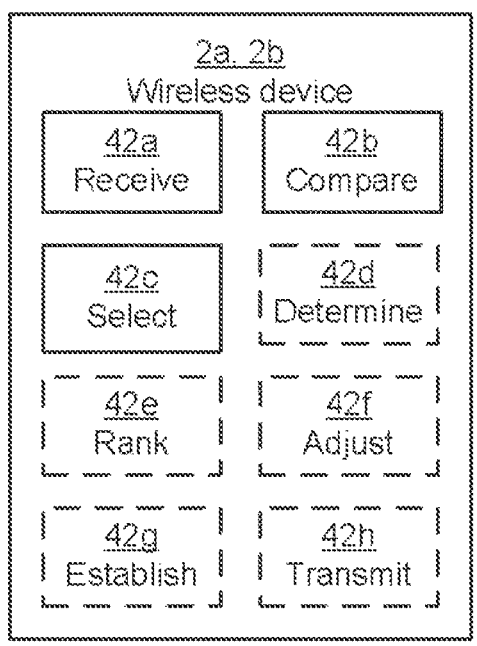

FIG. 2b schematically illustrates, in terms of a number of functional units, the components of a wireless device 2a, 2b according to an embodiment. The wireless device 2a, 2b of FIG. 2b comprises a number of functional units; a receiving unit 42a, a comparing unit 42b, and a selecting unit 42c. The wireless device 2a, 2b of FIG. 2b may further comprises a number of optional functional units, such as any of a determining unit 42d, a ranking unit 42e, an adjusting unit 4f, an establishing unit 42g, and a transmit unit 42h. The functionality of each functional unit 42a-h will be further disclosed below in the context of which the functional units may be used. In general terms, each functional unit 42a-h may be implemented in hardware or in software. The processing unit 21 may thus be arranged to from the memory 23 fetch instructions as provided by a functional unit 42a-h and to execute these instructions, thereby performing any steps as will be disclosed hereinafter.

Figure 3:
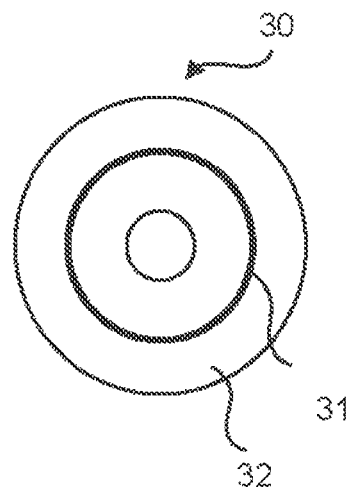
FIG. 3 shows one example of a computer program product comprising computer readable means according to embodiments.
Figure 4:
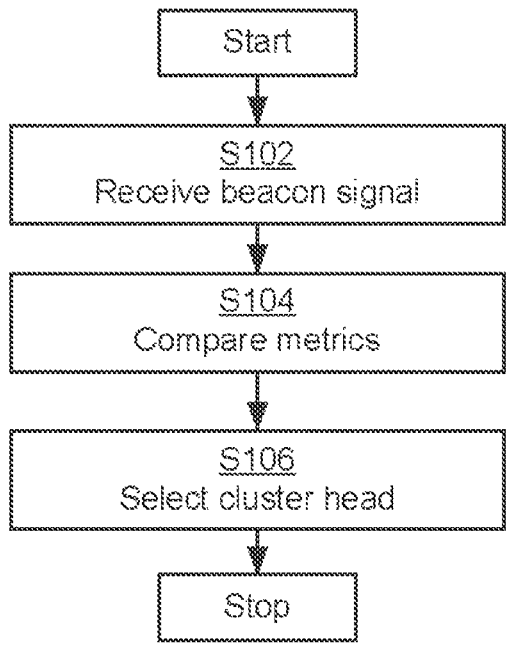
FIGS. 4 and 5 are flowcharts of methods according to embodiments.
Figure 5:
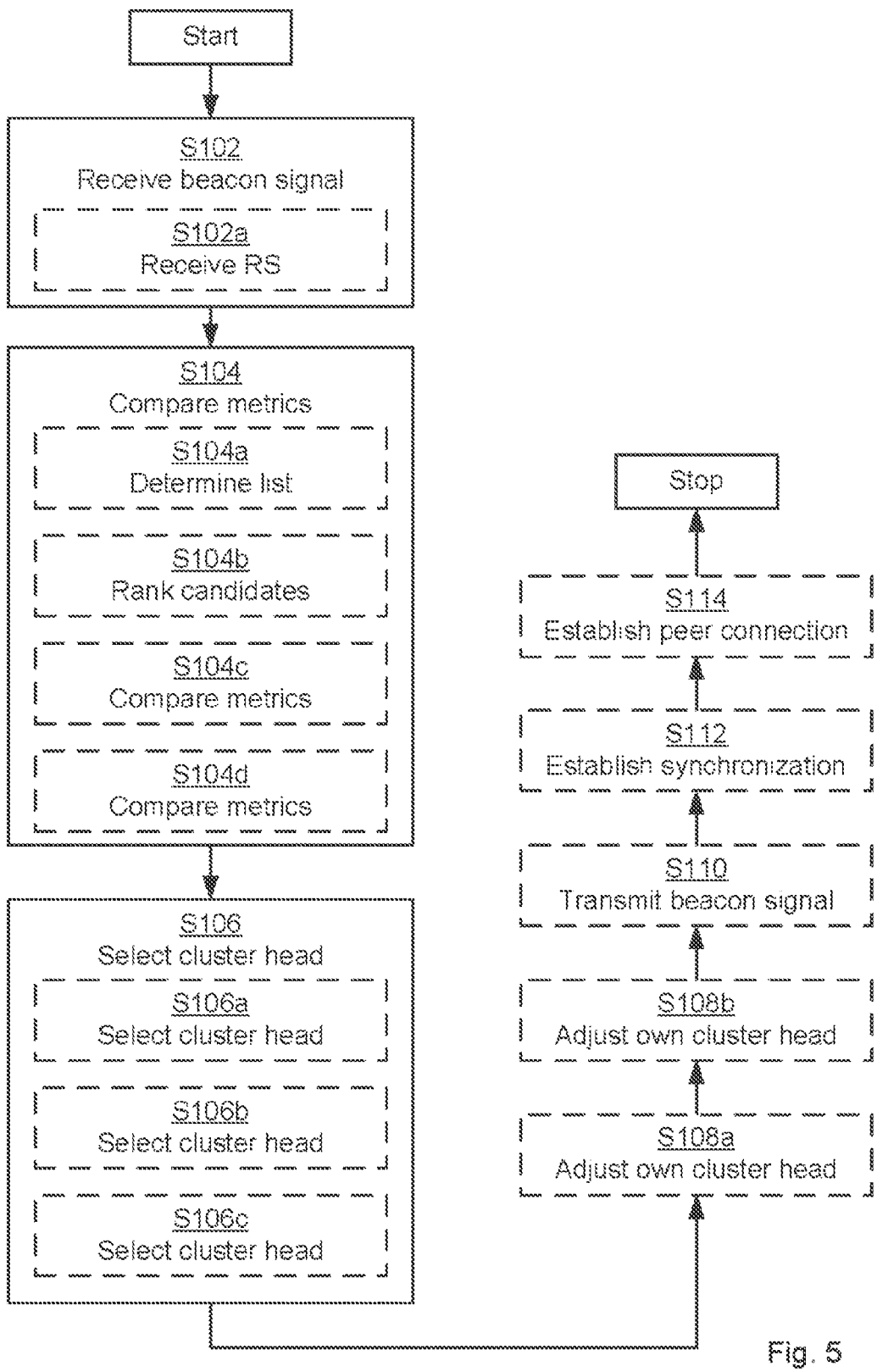

FIGS. 4 and 5 are flow charts illustrating embodiments of methods of cluster head selection in a communications network. The methods are performed by the wireless device 2a, 2b. The methods are advantageously provided as computer programs 31. FIG. 3 shows one example of a computer program product 30 comprising computer readable means 32. On this computer readable means 32, a computer program 31 can be stored, which computer program 31 can cause the processing unit 21 and thereto operatively coupled entities and devices, such as the memory 23, the I/O interface 22, the transmitter 25, the receiver 24 and/or the antennae 26 to execute methods according to embodiments described herein. In the example of FIG. 3, the computer program product 31 is illustrated as an optical disc, such as a CD (compact disc) or a DVD (digital versatile disc) or a Blu-Ray disc. The computer program product 30 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 31 is here schematically shown as a track on the depicted optical disk, the computer program 31 can be stored in any way which is suitable for the computer program product 30. The computer program 31 and/or computer program product 30 may thus provide means for performing any steps as herein disclosed.

In general terms, the herein presented embodiments are based on each local wireless device selecting one of its peer wireless devices in its proximity as cluster head. The selection of cluster head is based on making a comparison of metrics received from the peer wireless devices.

Particularly, a method for cluster head selection in a communications network 1a, 1b as performed by a wireless device 2a comprises in a step S102 receiving a respective beacon signal 6 from each one of at least one further wireless device 2b. The comparison may be performed by executing functionality of the receiving unit 42a. The computer program 31 and/or computer program product 30 may thus provide means for receiving the respective beacon signal 6. In FIG. 1a beacon signal 6 as transmitted by the wireless device 2b is schematically indicated. As the skilled person understands, beacon signals may be transmitted by any of the wireless devices illustrated in FIG. 1. The beacon signals 6 are received by the receiver 24 of the wireless device 2a. Each beacon signal comprises a cluster head capability metric. Examples of such cluster head capability metrics will be provided below. As noted above, selection of cluster head is based on making a comparison of metrics received from the peer wireless devices. The processing unit 21 of the wireless device 2a is therefore arranged to, in a step S104, compare each of the received cluster head capability metrics to at least one qualifying criterion. The computer program 31 and/or computer program product 30 may thus provide means for comparing each of the received cluster head capability metrics. The comparison may be performed by executing functionality of the comparing unit 42b. As will be further disclosed below, this decision can be based on multiple factors collected in the capability metric as transmitted in the beacon signal. The processing unit 21 of the wireless device 2a is then arranged to, in a step S106, select one of the at least one further wireless devices as the cluster head of the wireless device based on the comparison. The selection may be performed by executing functionality of the selecting unit 42c. The computer program 31 and/or computer program product 30 may thus provide means for selecting one of the at least one further wireless devices as the cluster head.

This procedure may be performed individually and locally by each wireless device 2a, 2b in the communications network 1a, 1b. Which peer wireless device that is selected as cluster head for a particular wireless device 2a, 2b is thus a local decision made by each wireless device. The set of wireless devices that have selected the same peer wireless device as cluster head, plus the wireless device acting as the cluster head itself, form a cluster. A wireless device that is selected by peer wireless device(s) as a cluster head may also select a peer cluster head (in a different cluster) based on the same general principles. The cluster head may be a network node 3a, 3b.

According to one embodiment the wireless device 2a is associated with a cluster head capability metric of its own. Thus, the wireless device 2a may be arranged both to receive a beacon signal through its receiver 24 and to transmit a beacon signal through its transmitter 25. The same may also apply for other wireless devices in the wireless communication system 1a. The cluster head capability metric may further be based on the received beacon signal. Thus, upon receiving a beacon signal comprising a cluster head capability metric from a wireless device 2b the wireless device 2a may update its own cluster head capability metric before transmitting its next beacon signal. Hence, according to an embodiment the processing unit 21 of the wireless device 2a is arranged to, in an optional step S108a, adjust its own cluster head capability metric based on the received beacon signal. The adjusting may be performed by executing functionality of the adjusting unit 42f. The computer program 31 and/or computer program product 30 may thus provide means for this adjusting. The transmitter 25 of the wireless device 2a may then be arranged to, in an optional step S110, transmit a beacon signal comprising the adjusted cluster head capability metric. The transmitting may be performed by executing functionality of the transmitting unit 42h. The computer program 31 and/or computer program product 30 may thus provide means for this transmitting. Further, the cluster head capability metric as transmitted in the beacon signal may be based on which wireless device has been selected as the cluster head. Hence according to an embodiment the processing unit 21 of the wireless device 2a is arranged to, in an optional step S108b, adjust its own cluster head capability metric based on the selected cluster head. The adjusting may be performed by executing functionality of the adjusting unit 42f. The computer program 31 and/or computer program product 30 may thus provide means for this adjusting.

When a wireless device has selected a peer wireless device as cluster head, it may establish a connection to this peer wireless device using existing D2D technology. Thus according to one embodiment the processing unit 21 of the wireless device 2a is arranged to, in an optional step S114 establish a peer connection to the selected cluster head. The establishing may be performed by executing functionality of the establishing unit 42g. The computer program 31 and/or computer program product 30 may thus provide means for this establishing.

Embodiments relating to different aspects of the cluster head selection will now be presented in detail.

Cluster Head Selection Procedure

There may be different ways to perform the cluster head selection. For example, the cluster head may be selected from a ranked list of candidate cluster heads. For example, the cluster head may be selected by comparing received metrics to a minimum value. For example, the cluster head may be selected by comparing received metrics to the metric of the wireless device itself. Embodiments related thereto will now be described in further detail.

According to a first embodiment the cluster head is selected from a ranked list of candidate cluster heads. According to the first embodiment the processing unit 21 of the wireless device 2a is arranged to, in an optional step S104a, determine a list of candidate cluster heads based on received cluster head capability metrics. The determining may be performed by executing functionality of the determining unit 42d. The computer program 31 and/or computer program product 30 may thus provide means for this determining. Determining a list of the candidate cluster heads according to their cluster head capability metrics may simplify the cluster head selection process. Further, the candidate cluster heads may be ranked based on their cluster head capability metrics. According to the first embodiment the processing unit 21 of the wireless device 2a is thus arranged to, in an optional step S104b, rank candidate cluster heads in the list based on fulfilled qualifying criteria for each received cluster head capability metrics. The ranking may be performed by executing functionality of the ranking unit 42e. The computer program 31 and/or computer program product 30 may thus provide means for this ranking. The cluster head may then be selected based on this ranking. According to the first embodiment the processing unit 21 of the wireless device 2a is thus arranged to, in an optional step S106a, select the cluster head from the list and based on the ranking. The selecting may be performed by executing functionality of the selecting unit 42c. The computer program 31 and/or computer program product 30 may thus provide means for this selecting. For example, the wireless device may select as its cluster head the first wireless device in the list (i.e., the highest ranked candidate cluster head). However, if further criteria reveal that the thus selected wireless device is not suitable as cluster head, another wireless device further down the list will be selected as the cluster head. Such further criteria will be disclosed below.

According to a second embodiment the cluster head is selected by comparing received metrics to a minimum value (as provided by means of a so-called Minimum Metric). The value of Minimum Metric may be dynamically configured by a network management entity or take a value as defined in a specification.

According to the second embodiment the processing unit 21 of the wireless device 2a is arranged to, in an optional step S104c, compare all received cluster head capability metrics to a minimum value. The comparing may be performed by executing functionality of the comparing unit 42b. The computer program 31 and/or computer program product 30 may thus provide means for this comparing. The minimum value may be predetermined. Hence, according the second embodiment the wireless device cannot select as its cluster head a wireless device with a cluster head capability metric below the minimum value (assuming that the suitability of a wireless device is proportional to the cluster head capability metric). Thereby the number of candidate cluster heads is reduced. The cluster head is then selected from this reduced number of candidate cluster heads. According to the second embodiment the processing unit 21 of the wireless device 2a is thus arranged to, in an optional step S106b, select as the cluster head one of the wireless devices having a cluster head capability metrics above the minimum value. The selecting may be performed by executing functionality of the selecting unit 42c. The computer program 31 and/or computer program product 30 may thus provide means for this selecting.

According to a third embodiment the cluster head is selected by comparing received metrics to the metric of the wireless device itself. In general terms, the third embodiment is based on the second embodiment. According to the third embodiment the wireless device 2a is assumed to be associated with a cluster head capability metric of its own. This cluster head capability metric may be determined in the same way as the cluster head capability metric of the other wireless devices 2b. According to the third embodiment the processing unit 21 of the wireless device 2a is arranged to, in an optional step S104d, compare all received cluster head capability metrics above the minimum value to its own cluster head capability metric. That is, wireless devices with cluster head capability metrics as received in step S102 and which as in step S104b have been determined to be above the minimum value are considered as candidate cluster heads. One of these candidate cluster heads is then chosen as the cluster head of the wireless device 2a. According to the third embodiment the processing unit 21 of the wireless device 2a is thus arranged to, in an optional step S106c, select as the cluster head one of the wireless devices having a cluster head capability metrics above the own cluster head capability metric. The selecting may be performed by executing functionality of the selecting unit 42c. The computer program 31 and/or computer program product 30 may thus provide means for this selecting.

Beacon Signal

There may be different ways to generate and transmit the beacon signal. For example, the beacon signal may comprise at least one reference signal (RS). For example, the beacon signal may comprise identity information. For example, the beacon signal may be transmitted at certain intervals. Embodiments related thereto will now be described in further detail.

According to one embodiment the beacon signal is transmitted at regular intervals. For example, wireless devices that need to participate in clusters may transmit a beacon signal at regular intervals. According to another embodiment, which will be further disclosed below, the transmittance of the beacon signal is event triggered.

According to one embodiment the beacon signal comprises an identity of the wireless device transmitting the beacon signal. The device identity may be a global identity, such as GUMMEI+TMSI (as described in TS 3GPP 23.003; GUMMEI is the Globally Unique MME Identity, where MME is the Mobility Management Entity, and TMSI is the Temporary Mobile Subscriber Identity). This may simplify device to device communication since the wireless devices may then directly address a message to the intended recipient.

According to one embodiment the receiver 24 of the wireless device 2a is arranged to, in an optional step S102a, receive at least one reference signal (RS). The receiving may be performed by executing functionality of the receiving unit 42a. The computer program 31 and/or computer program product 30 may thus provide means for this receiving. The at least one RS may be received from at least one other wireless device 2a or from a network node 3a, 3b. The RS may be used for synchronization purposes. Hence, according to one embodiment the processing unit 21 of the wireless device 2a is therefore arranged to, in an optional step S112c, establish synchronization with other wireless devices 2b based on the received RS. The establishing may be performed by executing functionality of the establishing unit 42g. The computer program 31 and/or computer program product 30 may thus provide means for this establishing. According to one embodiment the RS is part of the received beacon signal. Thus, transmittance and reception of beacon signals may be used for synchronization purposes, thereby stabilizing the clustering process.

Capability Metric

In general terms, the capability metrics 5 may contain several fields. One general purpose of the capability metric is to describe how well a wireless device 2a, 2b would serve as a cluster head. This decision is made by comparing the capability metrics to at least one qualifying criterion, as in step S104. Different properties of the capability metric will now be disclosed in further detail.

For example, the capability metric may comprise a first field comprising a parameter relating to whether the wireless device is within network coverage of a network node 3a, 3b or not. The first field may thus take a value in the set {TRUE, FALSE}. The first field may additionally or alternatively comprise information disclosing how many hops from one wireless device to another are required before reaching a network node (such as the number of one-way or two-way peer-to-peer communications links needed to be established before a wireless device can be operatively connected to a network node).

For example, the capability metric may comprise a second field comprising a parameter relating to whether the wireless device can serve as a cluster head or not. This may be dependent on processing, memory, and/or battery properties of the wireless device. The second field may take a value in the set {TRUE, FALSE}. Alternatively the second field may take a value in a scale, say 1-5, according to the processing, memory, and/or battery properties of the wireless device.

For example, the capability metric may comprise a third field comprising a parameter relating to the maximum possible transmission power of the wireless device. The third field may thus be integer-valued or real-valued.

For example, the capability metric may comprise a fourth field comprising a parameter relating to how many other wireless devices that currently have this wireless device as its cluster head. The fourth field may thus be integer-valued. For example, the fourth field may instead of disclosing the actual number of such other devices give this number in intervals; if four intervals are used, the intervals could be defined as follows: 0, 1 . . . 10, 11 . . . 50, >51. The fourth field may additionally or alternatively comprise and indicator of whether or not the wireless device has capacity to act as a cluster head for a further wireless device. This could avoid unnecessary connect attempts (e.g., in the form of establishment requests) that would otherwise be rejected.

For example, the capability metric may comprise a fifth field disclosing identity of the current cluster head of wireless device. If the wireless device does not have a cluster head, this field may be empty or take a null-value.

For example, the capability metric may comprise a sixth field disclosing a random number. The random number may be generated locally by the wireless device. The random number may for example be a uniformly distributed number from 0-255. The random number may be used as a deciding parameter if all other capability metrics of two wireless devices are equal. This will be further explained below.

However, as the skilled person understands, the capability metric may comprise fewer or further fields than the fields disclosed above. Further fields may provide further information which may be considered during the cluster head selection process According to one embodiment the cluster head capability metric thus represents at least one of the number of wireless devices currently having selected the wireless device as their cluster head, a network coverage parameter of the wireless device, capability of the wireless device serving as a cluster head, identity of the current cluster head of wireless device, and a random number.

Metric Comparison Function

A metric comparison function may be used to compare values of two or more cluster head capability metrics. The metric comparison function may be defined in several ways. According to one embodiment the metric comparison function has two inputs; Metric-1 representing a first cluster head capability metric (from one wireless device) and Metric-2 representing a second cluster head capability metric (from another wireless device). The output of the metric comparison function may then take one of three values:

(a) Metric-1>Metric-2, or
(b) Metric-1=Metric-2, or
(c) Metric-1<Metric-2.

Each field of Metric-1 may thus be compared with the corresponding field of Metric-2. Examples of fields have been disclosed above. In order to make this comparison, relation operators (such as greater than, equal to, and less than) may be defined for BOOLEAN; INTEGER and REAL types—depending on the types of the fields of the metrics. The output of this comparison may then, for each compared field, take one of the above three values, corresponding to the three values above.

After comparing all fields, the outputs from each comparison may be used to determine a final result of the metric comparison function.

The final result may be a weighted sum of the results of the individual field comparison. This weighted sum may in turn take a value according to one of (a), (b), or (c) above. In order to provide a weighted sum, each field may be associated with a weighting factor. The weighting factors may be regarded as the parameters of the fields being associated with an order of priority, where a high weighting factor thus may be given to a parameter having a high priority. The weighting factors may be binary, where a field thus either is considered or not considered during the metric comparison function, or be integer-valued or real-valued. Thus, according to one embodiment the cluster head capability metric comprises parameters having an order of priority. The cluster head may then be selected based on the order of priority of the parameters.

Qualifying Criteria

The qualifying criteria used by the wireless device $2a$ in step S104 and step S106 to determine whether a peer wireless device $2b$ may qualify as a cluster head candidate for wireless device $2a$, is thus based on the cluster head capability metric of the wireless device $2b$. There may be different ways to determine whether the at least one qualifying criterion is fulfilled or not.

According to one embodiment the at least one qualifying criterion is fulfilled if the cluster head capability metric of the wireless device $2b$ is greater than or equal to the above defined minimum Metric, using the metric comparison function defined above with the cluster head capability metric of the wireless device $2b$ and the Minimum Metric as inputs. Typically, the second field relating to cluster head capability of the Minimum Metric shall be set to TRUE.

If the cluster head capability metric of the wireless device $2b$ is greater than or equal to the Minimum Metric (as in step S104$b$), the wireless device $2a$ may then compare the cluster head capability metric of the wireless device $2b$ to its own metric, as in step S104$d$, using the metric comparison function defined above with the cluster head capability metric of the wireless device $2a$ and the cluster head capability metric of the wireless device $2b$ as inputs.

There may be further considerations relating to whether a candidate wireless device fulfils the qualifying criteria. One condition may be that a candidate wireless device shall not be considered as a cluster head if the candidate wireless device already has the wireless device $2a$ as its own cluster head. One condition may be that a candidate wireless device shall not be considered as a cluster head if the candidate wireless device already has transmitted a request to the wireless device $2a$ to act as its own cluster head. One condition may be that a candidate wireless device shall not be considered as a cluster head if the beacon signal transmitted by the candidate wireless device as received by the wireless device $2a$ has a SNR, RSRP, and/or RSRQ below a predetermined threshold value.

Triggering of Cluster Head Selection

The procedure of selecting a cluster head by the wireless device $2a$ may be triggered in several ways. For example As noted above the beacon signal may be transmitted at regular intervals. But for a wireless device that is already part of a cluster (i.e., it has already selected a wireless device as cluster head), there may be different ways to trigger further cluster head selection.

In general terms, embodiments relating to how to trigger further cluster head selection are based on events. One example of an event is if a wireless device intends to initiate a direct (or indirect) communications link to a peer wireless device. One example of an event is if a wireless device goes outside network coverage. One example of an event is if a wireless device detects failure of a network node. One example of an event is the expiration of a timer. This example may correspond to a cluster head selection being initiated at regular intervals. One example of an event is the reception of a beacon signal from a peer wireless device. The beacon signal may be a paging signal and thus act as a trigger for selecting a cluster head. One example of an event is the wireless device being powered-up, or when the radio transceiver of the wireless device is switched on. One example of an event is the reception in the device of user input. The user input may be received through a user interface of the wireless device, where a user, for example, may enter a device-to-device (D2D) mode. Thus, according to an embodiment, step S106 of selecting a cluster head is triggered by at least one of: the wireless device receiving a communications request to another wireless device, the wireless device receiving a paging signal from another wireless device, the wireless device receiving user input, and at power up signalling of the wireless device.

A wireless device which has already selected, and is operatively connected to, a cluster head, it may transmit a beacon at regular intervals or according to at least one other criteria. An example of such a criterion is based on the signal-to-noise ratio (SNR) of the wireless device. Thus, according to one embodiment the wireless device is arranged to transmit a beacon signal in a case the SNR from the wireless device to its current cluster head is below a predetermined threshold value. In more detail, when the SNR of the signal from the cluster head measured by the wireless device is less than a predetermined threshold, the wireless device is allowed to transmit beacon signals. For this purpose, the cluster head may transmit well-defined reference signals (RSs). Each WD may then perform measurements on such RSs. The SNR may be based on at least one of RSRP (Reference Signal received Power), RSRQ (Reference Signal received Quality), RSSI (received Signal Strength Indication). When the threshold is satisfied (i.e., if the wireless device is allowed to send out beacons), the wireless device can additionally apply a mapping rule from SNR/RSRP/RSRQ to the beacon transmission probability, i.e., higher probability for lower SNR/RSRP/RSRQ (thus implementing a dynamic beacon transmission probability calculation).

Scenario

According to a representative scenario the cluster head selection procedure by a wireless device 2a involves the following steps.

The wireless device 2a achieves synchronization with the other wireless devices 2b and/or network nodes 3a, 3b in the wireless communication system 1a (as in step S112 above).

The wireless device 2a then listens to beacon signals transmitted by peer wireless devices (as in step S102 above). The wireless device 2a may further transmit a beacon signal of its own. When the wireless device 2a receives a beacon signal from a peer wireless device (say wireless device 2b), the wireless device 2a first detects whether the cluster head capability metric of the wireless device 2b fulfils a qualifying criteria (as in step S104 above). If the cluster head capability metric of the wireless device 2b fulfils the qualifying criteria, the wireless device 2a adds wireless device 2b to its list of cluster head candidates (as in step S104a above).

The list of cluster head candidates maintained by the wireless device 2a is ranked (as in step S104b above). During the ranking, the wireless device 2a uses a metric comparison function to find out the relative order of two metrics, e.g. whether the cluster head capability metric of one candidate wireless device is higher than the cluster head capability metric of another wireless device, and/or if the metric of each candidate wireless device is higher than a Minimum Metric (as in step S104c above).

From the list of ranked cluster head candidates, the wireless device 2a then selects the candidate at the top of the list, say the wireless device 2b, (as in steps S106, S106a, S106b, S106c above). The wireless device 2a may then establish a connection to the selected wireless device 2b. The establishment procedure is described next. As the skilled person understands, the establishment procedure involves a message exchange between the wireless device 2a and the selected wireless device 2b. Message exchanges for establishing a peer connection is as such known in the art and further description thereof is therefore omitted. The establishment request message may by the wireless device 2a be transmitted using a resource as indicated in the beacon signal transmitted by the wireless device 2b, or it may be transmitted using a randomly selected resource.

Upon reception of an establishment request from the wireless device 2a, the wireless device 2b may have the opportunity to accept or reject the establishment from the wireless device 2a.

Upon acceptance from the wireless device 2b, the wireless device 2a now is operatively connected to the wireless device 2b which thus is the cluster head of the wireless device 2. The wireless device 2b further assigns an address to the wireless device 2a. This address may be a C-RNTI (Cell RNTI, where RNTI is a Radio Network Temporary Identity).

Upon rejection, the wireless device 2 selects the second highest ranked candidate cluster head wireless device and seeks to establish a connection to this second highest ranked wireless device, and so on until a cluster head is selected. The wireless device 2b may by the wireless device 2a then be avoided for further connection attempts during a predetermined time period. After this time period has expired, the wireless device 2b may by the wireless device 2a again be considered for further connection attempts.

Resulting Cluster Head Configuration

Figure 6:
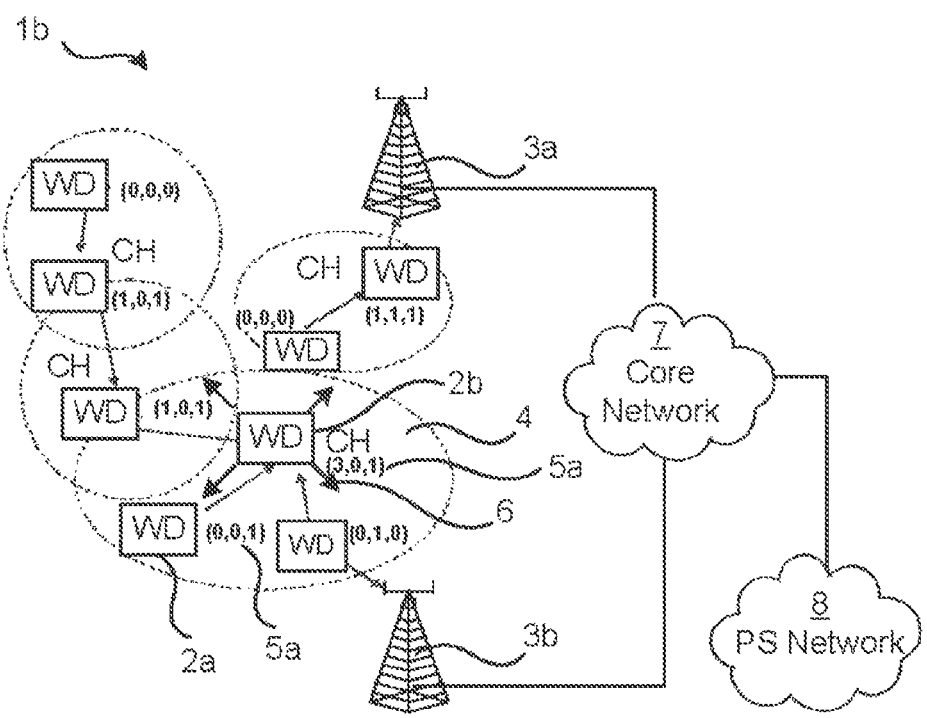
FIG. 6 is a schematic diagram illustrating a communications network according to embodiments.

FIG. 6 shows a schematic overview of an exemplifying wireless communication system 1b. The wireless communication system 1b is similar to the wireless communication system 1a of FIG. 1. The wireless communication system 1b thus comprises network nodes 3a, 3b providing network coverage over cells (not shown). Each cell is served by at least one of the network nodes 3a, 3b. A wireless device (WD) 2a, 2b, positioned in a particular cell is thus provided network service by the network node 3a, 3b serving that particular cell. Further, the network nodes 3a, 3b are arranged to communicate with other network nodes 3a, 3b via communications links. The network nodes 3a, 3b are also operatively connected to a core network 7. The core network 7 may provide services and data to the WD 2a, 2b operatively connected to at least one of the network nodes 3a, 3b from an external packet switched (PS) data network 8. In FIG. 6 two cluster head capability metrics have been marked at reference numerals 5a, 5b, one associated with wireless device 2a, and one associated with wireless device 2b. Further, in FIG. 6 also a number of clusters have been schematically illustrated, one of which has been marked at reference numeral 4. Further, in FIG. 6, arrows in each cluster point at the cluster head of each cluster. Thus, for example, wireless device 2b acts as cluster head for wireless device 2a. As is clear from FIG. 6, not all wireless devices may communicate with each other by means only of D2D communication. However, the disclosed mechanisms for cluster head selection ensure that each wireless device is enabled to communicate with a network node; either directly or via at least one D2D communications links.

In summary there has thus been disclosed mechanism for cluster head selection in a communications network which may involve a wireless device to listen for beacon signals transmitted by other wireless devices, transmitting and adjusting its own beacon signal, wherein the combination of transmission and reception of beacon signals enables each wireless device to determine what resources to be transmitted its own beacon signal, which resources are to be used for a connection request, and how to determine its own cluster head capability metric based on what information has been received from other wireless devices.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A wireless device for cluster head selection in a communications network, the wireless device comprising:
a receiver configured to receive a respective beacon signal from each wireless device among a plurality of wireless devices, each beacon signal comprising a cluster head capability metric; and
a processing circuit configured to:
compare each of the received cluster head capability metrics to at least one qualifying criterion;

select a first wireless device of the plurality of wireless devices as the cluster head of the wireless device based on the comparison;

send an establishment request message to the first wireless device; and select a second wireless device of the plurality of wireless devices as the cluster head of the wireless device based on the comparison, responsive to a receipt of a rejection of the establishment request message to the first wireless device.

2. The wireless device of claim 1, wherein the processing circuit is configured to:

compare all received cluster head capability metrics to a minimum value; and select, as the first wireless device, one of the wireless devices having a cluster head capability metric above the minimum value.

3. The wireless device of claim 2:

wherein the wireless device is associated with a cluster head capability metric of its own;

wherein the processing circuit is configured to:

compare all received cluster head capability metrics above the minimum value to the own cluster head capability metric; and select, as the first wireless device, one of the wireless devices having a cluster head capability metrics above the own cluster head capability metric.

4. The wireless device of claim 1:

wherein the wireless device is associated with a cluster head capability metric of its own;

wherein the processing circuit is configured to adjust its own cluster head capability metric based on the received beacon signal; and wherein the wireless device further comprises a transmitter configured to transmit a beacon signal comprising the adjusted cluster head capability metric.

5. The wireless device of claim 1:

wherein the receiver is configured to receive at least one reference signal (RS); and wherein the processing circuit is configured to establish synchronization with other wireless devices based on the received RS.

6. A method for cluster head selection in a communications network, the method implemented in a wireless device and comprising:

receiving a respective beacon signal from each wireless device among a plurality of wireless devices, each beacon signal comprising a cluster head capability metric;

comparing each of the received cluster head capability metrics to at least one qualifying criterion;

selecting a first wireless device of the plurality of wireless devices as the cluster head of the wireless device based on the comparison;

sending an establishment request message to the first wireless device; and selecting a second wireless device of the plurality of wireless devices as the cluster head of the wireless device based on the comparison, responsive to a receipt of a rejection of the establishment request message to the first wireless device.

7. The method of claim 6, wherein:

said comparing comprises comparing all received cluster head capability metrics to a minimum value; and said selecting the first wireless device comprises selecting, as the first wireless device, one of the wireless devices having a cluster head capability metric above the minimum value.

8. The method of claim 7, wherein the wireless device is associated with a cluster head capability metric of its own, and wherein:

said comparing comprises comparing all received cluster head capability metrics above the minimum value to the own cluster head capability metric; and said selecting the first wireless device comprises selecting, as the first wireless device, one of the wireless devices having a cluster head capability metrics above the own cluster head capability metric.

9. The method of claim 6 wherein the wireless device is associated with a cluster head capability metric of its own, the method further comprising the wireless device:

adjusting its own cluster head capability metric based on the received beacon signal; and transmitting a beacon signal comprising the adjusted cluster head capability metric.

10. The method of claim 6 further comprising:

receiving at least one reference signal (RS); and establishing synchronization with other wireless devices based on the received RS.

11. A computer program product stored in a non-transitory computer-readable medium for controlling cluster head selection in a communications network, the computer program product comprising software instructions which, when run on a processing circuit of a wireless device causes the wireless device to:

receive a respective beacon signal from each wireless device among a plurality of wireless devices, each beacon signal comprising a cluster head capability metric;

compare each of the received cluster head capability metrics to at least one qualifying criterion;

select a first wireless device of the plurality of wireless devices as the cluster head of the wireless device based on the comparison;

send an establishment request message to the first wireless device; and select a second wireless device of the plurality of wireless devices as the cluster head of the wireless device based on the comparison, responsive to a receipt of a rejection of the establishment request message to the first wireless device.

* * * * *